(12) United States Patent  
Craig et al.

(10) Patent No.: US 9,089,905 B1
(45) Date of Patent: Jul. 28, 2015

(54) OMNI-DIRECTIONAL DEBURRING BLADE

(75) Inventors: Brent F. Craig, Seattle, WA (US); David P. Banks, Everett, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 13/484,087

(22) Filed: May 30, 2012

(51) Int. Cl.
*B23B 51/08* (2006.01)
*B23B 51/10* (2006.01)

(52) U.S. Cl.
CPC ............ *B23B 51/08* (2013.01); *B23B 51/10* (2013.01); *Y10T 408/8588* (2015.01); *Y10T 408/8595* (2015.01); *Y10T 408/85884* (2015.01)

(58) Field of Classification Search
CPC .................................. B23B 51/08; B23B 51/10
USPC ..................... 408/153, 158, 159, 172, 180
See application file for complete search history.

(56) References Cited

U.S. PATENT DOCUMENTS

| | | | | | |
|---|---|---|---|---|---|
| 2,373,474 | A | * | 4/1945 | Heyer | 408/26 |
| 2,433,976 | A | * | 1/1948 | Babka | 82/1.2 |
| 2,855,812 | A | * | 10/1958 | Fried | 408/159 |
| 2,991,670 | A | * | 7/1961 | Snell | 82/1.2 |
| 3,017,791 | A | * | 1/1962 | Fried | 82/1.2 |
| 3,195,378 | A | * | 7/1965 | Cogsdill | 408/26 |
| 3,434,202 | A | * | 3/1969 | Szajna | 29/566 |
| 3,970,406 | A | * | 7/1976 | Kubicek | 408/127 |
| 4,411,324 | A | * | 10/1983 | Liebig | 175/289 |
| 4,580,932 | A | | 4/1986 | Depperman | |
| 4,690,594 | A | * | 9/1987 | Kato | 408/159 |
| 5,797,709 | A | * | 8/1998 | Payne | 408/159 |
| 6,533,505 | B1 | | 3/2003 | Robinson | |
| 7,217,070 | B2 | | 5/2007 | Hecht | |
| 2004/0101377 | A1 | * | 5/2004 | Robinson | 408/181 |
| 2004/0101378 | A1 | * | 5/2004 | Wiles | 408/188 |
| 2005/0132580 | A1 | * | 6/2005 | Heule | 30/317 |
| 2006/0127192 | A1 | * | 6/2006 | Robinson | 408/156 |
| 2009/0129877 | A1 | | 5/2009 | Brady | |
| 2009/0304470 | A1 | | 12/2009 | Robinson et al. | |

FOREIGN PATENT DOCUMENTS

| | | | | | |
|---|---|---|---|---|---|
| JP | 02-185309 | A | * | 7/1990 | ............ B23B 51/10 |
| JP | 05-123914 | A | * | 5/1993 | ............ B23B 51/08 |

OTHER PUBLICATIONS

Nobur JB & CNF Series, Precision Chamfering, pp. 67-81(Undated).
Deburring Tools, Cogsdill Tool Products, Inc., pp. 1-28 (2003).

* cited by examiner

*Primary Examiner* — Sunil K Singh
*Assistant Examiner* — Ryan Rufo
(74) *Attorney, Agent, or Firm* — Ostrager Chong Flaherty & Broitman P.C.

(57) ABSTRACT

A tool that facilitates deburring interfaces in any stack orientation when access is limited to one side of the structure. The deburring blade has the capability to enter drilled holes and remove metallic burrs from mixed material interfaces regardless of stack orientation, i.e., metallic entrance or exit burrs within the stack. The blade design incorporates a slotted feature that hinges on a steel pin. The slot orientation is parallel to the metallic interface of the stackup. The resultant forces of metal material removal are reacted by the walls of the slot, allowing removal of metal material on either the front or back side of the blade tip.

8 Claims, 5 Drawing Sheets

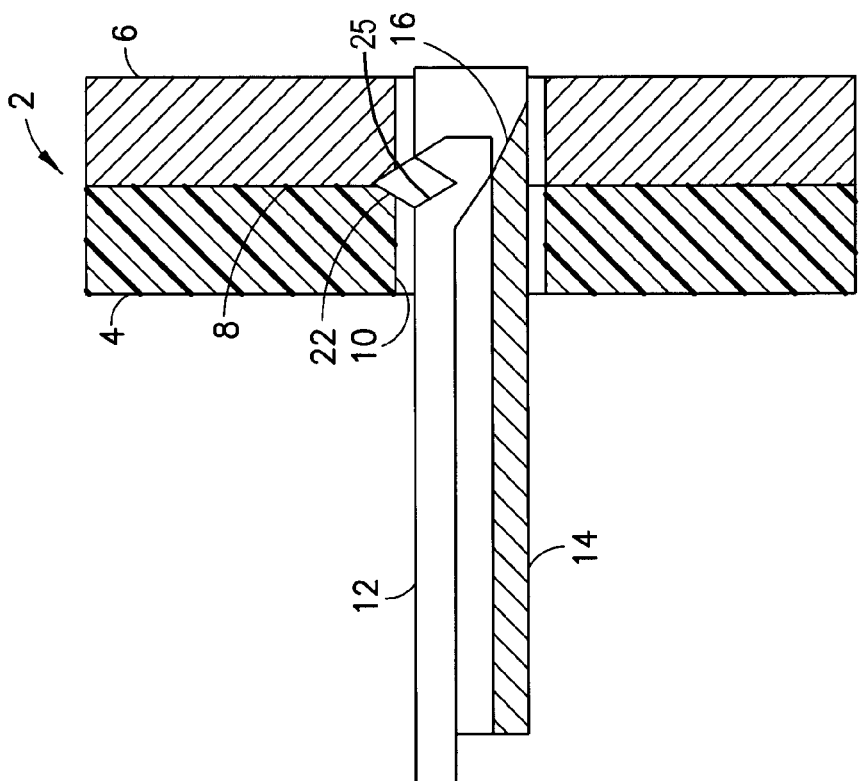
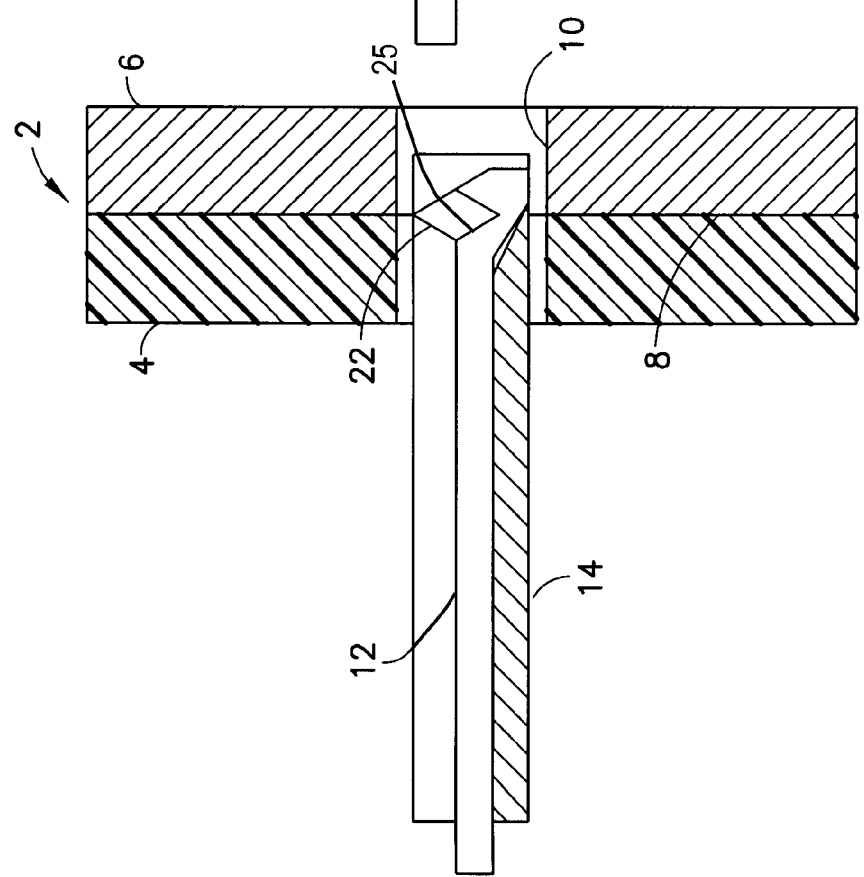

OMNI-DIRECTIONAL DEBURRING BLADE

BACKGROUND

This disclosure relates generally to drilling systems and methods for preparing composite material and substrate materials for assembly and, in particular, relates to tools and methods for deburring after drilling operations.

Composite components are being utilized in a wide variety of articles of manufacture due to their high strength and light weight. This is particularly true in the field of aircraft manufacturing. Typical materials used in the manufacture of composite components include glass or graphite fibers that are embedded in resins, such as phenolic, epoxy, and bismaleimide resins. A composite lamination can be built up by laying successive plies of fiber tows (e.g., carbon fiber tows preimpregnated with a thermoset epoxy resin) around a mandrel and then curing. As more advanced materials and a wider variety of material forms have become available, aerospace usage of composites has increased.

For example, composites are used in conjunction with metal substrates to form an assembly that may be used to construct a larger structure, for example, of an aircraft or other vehicle. The assembly may include a composite material and a structural metal substrate arranged in a stacked or layered orientation (referred to herein as a "stackup"). The composite material may, for example, be carbon fiber-reinforced plastic (CFRP) or other fiber-reinforced material. The structural metal substrate may, for example, be titanium, aluminum or steel. The metal substrate may be used to build a skeleton or frame, with the composite material attached to and covering the frame. For this reason the composite material is sometimes referred to as a skin. The metal and composite materials may be shaped, contoured, or curved into virtually any shape desired.

Of course the composite material and metal substrate have different physical attributes and properties, and exhibit different behavior in use. Due to those facts, attaching the composite material to the metal substrate can be challenging. For example, the materials may be joined to each another with a fastener that requires holes to be drilled in each respective material. Separate handling of the composite material from the metal substrate is undesirable. Especially for relatively large structures having many fasteners distributed over the structure, such as in the fabrication of an aircraft, avoiding separate drilling of the holes in each of the composite material and the metal substrate may result in appreciable reductions in production times and reduction in costs of fabricating the aircraft.

To avoid separate drilling, many machining applications involve drilling and/or reaming a hybrid stack-up of composite and metal materials. For example, certain aircraft require that a wing made from a composite material, such as CFRP, be joined to a titanium section of an aircraft body with fasteners that pass through holes made through the mating sections. When using fasteners to attach composite skins to metal substrates, coaxial holes must be drilled in both the skin and an underlying metal substrate. High-quality holes must be produced in such materials with dimensions within narrow tolerances.

The wing-to-body join task typically requires a three-step conventional drilling process comprising a pilot drill, followed by a step drill, followed by a finish diameter reamer. Frequently the reaming process is followed by a deburring operation. Various special tools are known for removing burrs from the circumferential edges surrounding openings of drilled holes and for adding chamfers thereto. In particular, mechanical hole-deburring tools are known which remove burrs on the front, back, or both sides of drilled holes in one pass, working from one side only.

The design of airframe structure dictates the elements in the stack. Metal components are often times "sandwiched" between CFRP components. The stack orientations are driven by structural loading requirements. The high-load areas at the wing-to-body interface typically have external metal components whereas the body section joins are mostly CFRP with interior metal components. Location and access are the primary drivers for determining from which direction one can approach the interface for deburring operations.

A known deburring blade has been used to perform metal material removal as part of a deburring operation within a drilled and/or reamed hole in a mixed material interface, e.g. CFRP/Ti or Ti/CFRP. The existing blade design provides for cutting force reaction in only a single direction. With the existing blade design, when attempting to deburr using the forward portion of a double-acting cutter tip, the cutting reaction forces "push" the blade back in the hole and a reduced amount of material is removed.

There is a need for a blade design that will enable loading of the cutter blade from either side of the cutter tip without any relative movement away from the metal interface as a result of cutting forces.

SUMMARY

A tool is disclosed that facilitates deburring interfaces in any stack orientation when access is limited to one side of the structure. This tool has a cutter blade designed to perform metal material removal as part of a deburring operation within a drilled hole in a mixed material stackup. The blade design provides the capacity to enter hole features and remove metallic burrs from mixed material interfaces regardless of stack orientation, i.e., removes metallic entrance or exit burrs within the stack. In accordance with one embodiment, the blade design incorporates a slotted feature that hinges on a steel pin. The slot orientation is generally parallel to the metal/composite interface in the stackup. The resultant forces of metal material removal are reacted by the walls of the slot, allowing material removal on either the front side or back side of the double-acting cutter tip.

This blade design enables loading of the cutter blade from either side of the blade tip without any relative movement away from the metal/composite interface as a result of cutting forces. In a single design, the new blade can deburr equal amounts of metal material from a mixed material interface regardless of material orientation in the stack, e.g. CFRP/Ti or Ti/CFRP. The "trapping" of the blade position within the hole provides a more reliable and precise deburring operation without the potential negative consequences of linear movement.

Other aspects of the invention are disclosed and claimed below.

BRIEF DESCRIPTION OF THE DRAWINGS

FIG. 1 is a diagram showing a sectional view of a drilled hole in a metal/composite stackup, the hole having a cutter blade of a deburring tool inserted therein and in position to commence deburring the metal/composite interface.

FIG. 2 is a diagram showing a sectional view of the same hole shown in FIG. 1, except that the cutter tip is shown in a typical position as it is deburring the interface.

Reference will hereinafter be made to the drawings in which similar elements in different drawings bear the same reference numerals.

DETAILED DESCRIPTION

Figure 3:
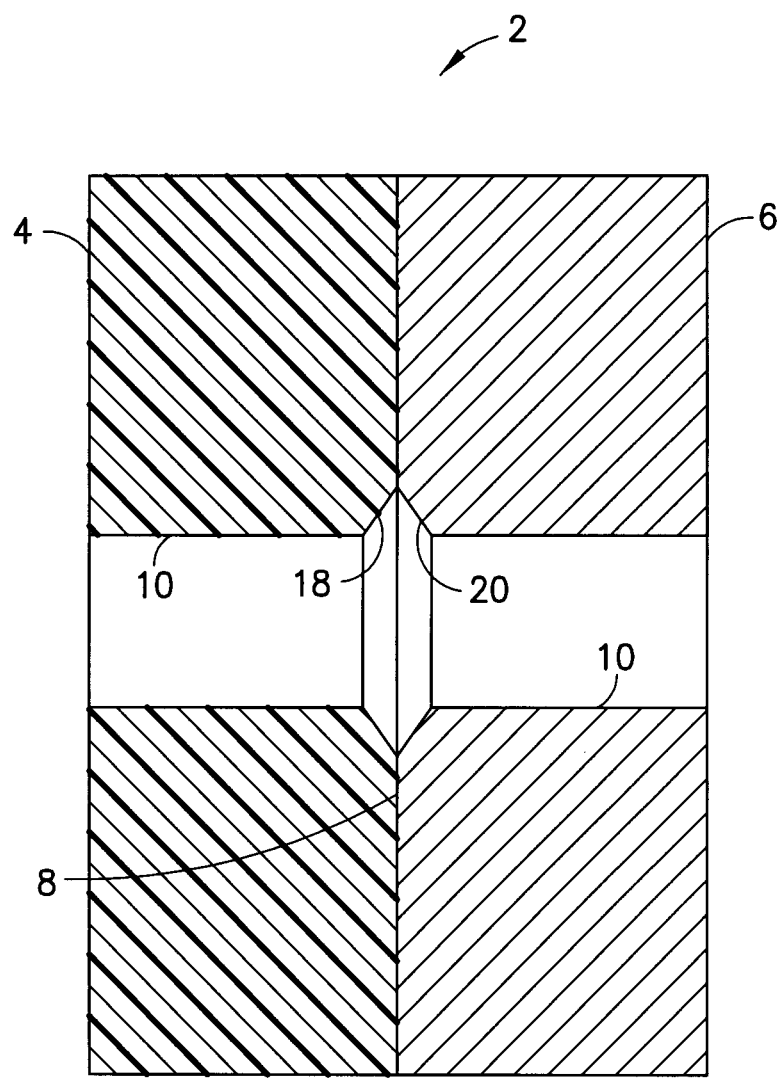
FIG. 3 is a diagram showing a sectional view of the same hole shown in FIGS. 1 and 2, after completion of the deburring operation and removal of the deburring tool from the hole.

FIGS. 1 through 3 are sectional views showing three stages in a process for deburring in a circumferential region where an interface 8 intersects the wall of a drilled hole 10 in a stackup 2 made of dissimilar materials. For the purpose of illustration, it will be assumed that the stackup 2 comprises a composite material 4 and a metal substrate 6. The composite material 4 may be CFRP or other fiber-reinforced material. The metal substrate 6 may, for example, be titanium, aluminum, steel or another structural metal. Any metal burr formed during drilling the hole is removed during the deburring operation. Adjacent composite material is also removed.

The deburring operation is performed by an automated system comprising a tool having a pilot/blade assembly. FIG. 1 shows a cutter blade 12 that is disposed in a slot of a pilot 14. Parts of the deburring tool other than portions of the blade and pilot are not shown in FIGS. 1-3. A double-acting cutter tip 22 (e.g., coated with carbide) is attached to a pocket 25 in the distal end of the cutter blade 12 by brazing. The pilot 14 is axially movable relative to the cutter blade 12. The cutter blade 12 can pivot relative to a portion of the tool (not shown in FIGS. 1-3) which does not move with the pilot. The structures which facilitate axial movement of the pilot and pivoting of the cutter blade will be explained later with reference to FIG. 4.

FIG. 1 shows the state wherein the pilot/blade assembly is properly positioned to begin the deburring operation. In the proper position, the apex of the cutter tip 22 is aligned with the metal/composite interface 8 within a specified tolerance. This alignment is achieved using known automated procedures for locating an interface between dissimilar materials. The system and method for detecting the material interface incorporates electrical equipment (not shown) and an electric circuit, plus data processing to accurately identify the position, relative to a drilling machine, of the interface 8 between two materials of dissimilar electrical characteristics (e.g., the composite material and the metal substrate) when in the electric circuit. The differing electrical properties and characteristics of each material result in changes to electrical conditions in the electric circuit. By monitoring the changes in electrical conditions in the circuit, the interface 8 between the two materials 4 and 6 may be detected and located. For example, the interface 8 can be located using the following automated procedure disclosed in United States Patent Application Publ. No. 2009/0129877, the disclosure of which is incorporated herein in its entirety.

In one specific implementation, a resistance sensing routine is used to locate the interface between a metal substrate and a layer of CFRP material. During the resistance sensing routine, the pilot/blade assembly is not rotating. The resistance sensing routine comprises the following steps: (1) the pilot/blade assembly (blade retracted) enters the hole to a preset depth in the CFRP; (2) the pilot is extended, causing the blade to extend until the cutter tip contact the hole wall. (3) The electrical resistance of the contacted material is measured.

If the measured electrical resistance indicates the presence of CFRP, then the following steps are performed: (4) the pilot is retracted, thereby retracting the blade; and (5) the pilot/blade assembly is moved one increment (e.g., 10 mils) toward the metal. Then steps (2) and (3) are repeated. If the measured electrical resistance still indicates the presence of CFRP, then steps (4), (5), (2) and (3) are repeated in that order. This procedure is repeated until step (3) indicates the presence of metal.

If the measured electrical resistance indicates the presence of metal, then step (4) is repeated; thereafter the following steps are performed: (6) the pilot/blade assembly is moved a smaller increment (e.g., 2 mils) toward the CFRP; and then steps (2) and (3) are repeated. If the measured electrical resistance again indicates the presence of metal, then steps (4), (6), (2) and (3) are repeated in that order. This procedure is repeated until step (3) indicates the presence of CFRP. When CFRP is present, the interface can be effectively located. For example, if the advancement increment was 2 mils and before the advance, the detected material was metal, whereas after the advance, the detected material was CFRP, then the control computer knows that the cutter tip is within ±2 mils of the interface. After CFRP has been detected, step (4) is repeated and the system is ready to perform the deburring operation.

To enable deburring, first the pilot/blade assembly is rotated. Then the pilot is extended an amount sufficient to extend the cutter blade to its maximum protrusion while the assembly is still rotating. As the rotating cutter tip presses against the hole wall, material in the area where the interface intersects the hole wall is removed.

FIG. 2 shows the changed position of the cutting tip 22 relative to the pilot 14 during deburring. Although not apparent from a comparison of the respective orientations of the cutter blade 12 seen in FIGS. 1 and 2, the change in position of the cutting tip 22 is produced by pivoting the cutter blade 12 about a pin (see item 52 in FIG. 4) that is attached to a portion of the tool that rotates with the blade 12, but does not move axially with the pilot 14. The cutter blade 12 pivots in response to forward axial movement of pilot 14 relative to cutter blade 12. The pilot has a ramped camming surface 16 at its distal end. As the pilot 14 is moved forward from the retracted position seen in FIG. 1 to its extended position seen in FIG. 2, the ramped camming surface 16 slides under the heel of the cutter blade 12 and cams the blade heel upward. This deflection occurs while the cutter blade 12 and shaft 14 are rotating. Therefore, as the cutter tip 22 moves further out of the pilot slot, it removes material from the target region. The maximum protrusion of the cutter tip 22 produces chamfers having the desired depth. When the desired depth has been reached, i.e., sufficient material has been removed, the pilot is retracted, causing the blade to return to its retracted (i.e., home) position. Then the assembly exits the hole.

Upon completion of the deburring operation, ideally both materials will have been chamfered in the area of the interface/hole intersection as seen in FIG. 3. One side of the cutting edge forms a chamfer 18 in the composite material 4, while the other side of the cutting edge forms a chamfer 20 in the metal substrate 6. During the deburring process, any metal burr at the intersection of interface 8 and the wall of hole 10 is removed. The removal of composite material is incidental to the metal deburring process. The metal removal produces higher reaction forces on the cutter blade than are produced by the removal of composite material.

Figure 4:
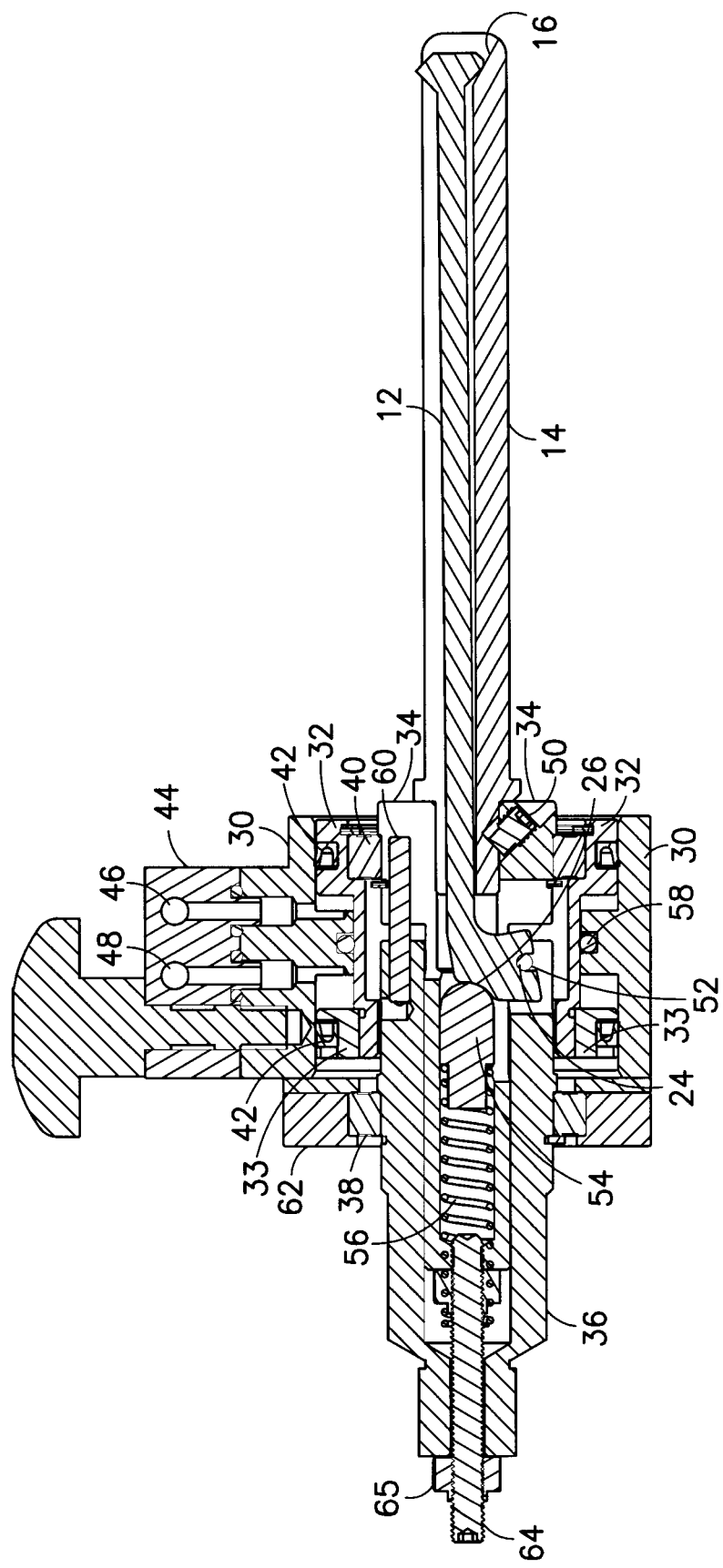
FIG. 4 is a diagram showing a sectional view of a deburring tool having a pilot/blade assembly wherein the cutter blade incorporates a slot having sides oriented generally perpendicular to the blade axis. The pilot in FIG. 4 is shown in a partially extended position.

While the deburring tool is shown inserted into hole 10 from the left as seen from the vantage point in FIGS. 1-3, it should be appreciated at the outset that the deburring tool disclosed herein can alternatively be inserted into hole 10 from the right with equivalent deburring performance. More specifically, FIG. 2 depicts a situation wherein the deburring tool is inserted in the hole 10 from the left and the forward portion of the double-acting cutter tip 22 deburrs the metal material. In this case, the cutting reaction forces tend to "push" the cutter blade 12 leftward in FIG. 2, i.e., rearward relative to the rest of the tool (not shown). Conversely, if the tool were inserted from the right, the metal material would be deburred by the rearward portion of the double-acting cutter tip 22. In the latter case, the cutting reaction forces would again tend to "push" the cutter blade 12 leftward in FIG. 2, but this movement would be in a forward direction relative to the rest of the tool. The deburring tool shown in FIG. 4 is designed to accommodate and counteract cutting force reactions in both directions. In particular, the cutting tip is "biased" to the CFRP side of the interface so that more CFRP material than metal material is removed.

Referring to FIG. 4, the deburring tool in accordance with one embodiment comprises a non-rotating assembly and a rotatable assembly rotatably supported by bearings 38 and 40 mounted to the non-rotating assembly. The non-rotating assembly comprises: an air cylinder body 30; a removable port connector 44 attached to the air cylinder body 30; a piston assembly 32/33 slidably nested inside the air cylinder body 30; and a flange 34 which holds bearing 38. The port connector 44 comprises two air cylinder ports 46 and 48.

The rotatable assembly comprises: a hollow body 36 having a cylindrical bore and pilot holder 34 having a hollow piston portion which is slidably nested in the cylindrical bore of hollow body 36. A dowel pin 60 aligns and prevents rotation of parts 34 and 36. These two parts can rotate together and as the air cylinder extends and retracts, allows linear motion as well. The pilot holder 34 has an opening which receives a proximal end of the pilot 14. The pilot 14 is retained in the pilot holder 34 by a set screw 50. The hollow body 36 is rotatably supported by bearing 38; the pilot holder 34 is rotatably supported by bearing 40. The rotatable assembly further comprises the cutter blade 12 and the pilot 14.

As previously described, the pilot 14 (and pilot holder 34) can be alternatingly extended and retracted. This is accomplished by means of a piston assembly comprising an air cylinder piston 32 and a piston flange 33 attached to the rearward outer peripheral portion of air cylinder piston 32. The air cylinder piston 32 holds bearing 40. The piston assembly 32/33 is nested inside the air cylinder body 30 and axially movable relative thereto. More specifically, the piston assembly 32/33 is free to slide back and forth along the cylinder axis between opposite limit positions inside the air cylinder body 30. As the piston assembly moves, the pilot holder 34 and pilot 14, which are supported by bearing 40, also move. The air cylinder body 30 and piston assembly 32/33 are configured in conventional manner to provide two annular chambers which are in respective fluid communications with ports 46 and 48. When pressurized air is supplied to port 46, the air pressure drives the piston assembly 32/33 (and pilot holder 34) forward, thereby extending the pilot 14. Conversely, when pressurized air is supplied to port 48, the air pressure drives the piston assembly 32/33 (and pilot holder 34) rearward, thereby retracting the pilot 14. Leakage of pressurized air between air cylinder body 30 and piston assembly 32/33 is prevented or reduced by a pair of lip seal 42 and by an O-ring 58.

The pilot 14 in FIG. 4 is shown in a partially extended position. During extension or retraction of the pilot 14, the cutter blade 12 and hollow body 36 do not move axially. The cutter blade 12 is coupled to a blade attachment pin 52, which is attached to and projects from the wall of a radial slot formed in the wall of the hollow body 36 at a forward end thereof. The proximal end of the cutter blade 12 has a slot 24, which receives the blade attachment pin 52 when the blade 12 is installed in the tool. The sides of the slot 24 are mutually parallel and generally directed perpendicular to the axis along which the pilot is moved. The abutment of the sides of slot 24 against the blade attachment pin 52 prevents axial displacement (i.e., forward/aft movement) of the cutter blade 12 that might otherwise occur due to an axial reaction force component generated during deburring. To keep the blade 12 in place so that slot 24 does not rise off of the pin 52, a spring-loaded round nose plunger 54 presses against a fillet 26 formed on the proximal end of blade 12. The fillet 26 is shaped to receive a portion of the round nose of plunger 54. More specifically, the fillet 26 is in contact with a surface area of the round nose plunger 54 which is not centered along the axis of rotation of hollow body 36. The plunger 54 is biased in a forward axial direction by the spring 56. The orientation and position of fillet 26 are such that the axial spring force produces a transverse biasing force component acting on the fillet 26 to retain the end of slot 24 against pin 52. The plunger 54 is slidably nested in a hollow shaft of the pilot holder 34 (which shaft is slidably nested in a cylindrical bore of the hollow body 36). When the pilot holder 34 moves forward during extension of the pilot 14, the plunger 54 does not move, but rather the spring 56 compresses and continues to urge the plunger 54 against the fillet 26 on the proximal end of blade 12.

The maximum extend distance of the pilot 14 can be set using a threaded rod 64. The forward end of threaded rod 64 is threadably coupled to the rearward end of the hollow shaft portion of the pilot holder 34. A nut 65 is threaded onto the rearward end of the threaded rod 64. Abutment of the forward face of nut 65 against the rearward face of hollow body 36 determines the maximum extend distance of the pilot 14.

The distal end of the pilot 14 has a ramped camming surface 16 formed thereon. A major portion of the shaft of cutter blade 12 is disposed in a longitudinal slot formed in pilot 14 (indicated by the unhatched portion of pilot 14 in FIG. 4). When the piston 32 is displaced in a forward direction, the resulting extension of pilot 14 and its ramped camming surface 16 causes the cutter blade to rotate about pin 52. Although the spring-loaded plunger 54 produces a force component on the fillet 26 which resists pivoting of the cutter blade 12 about the pin 52, that force component is insufficient to prevent such pivoting. As the cutter blade pivots, the cutter tip 22 protrudes from the slot in the pilot.

Figure 5:
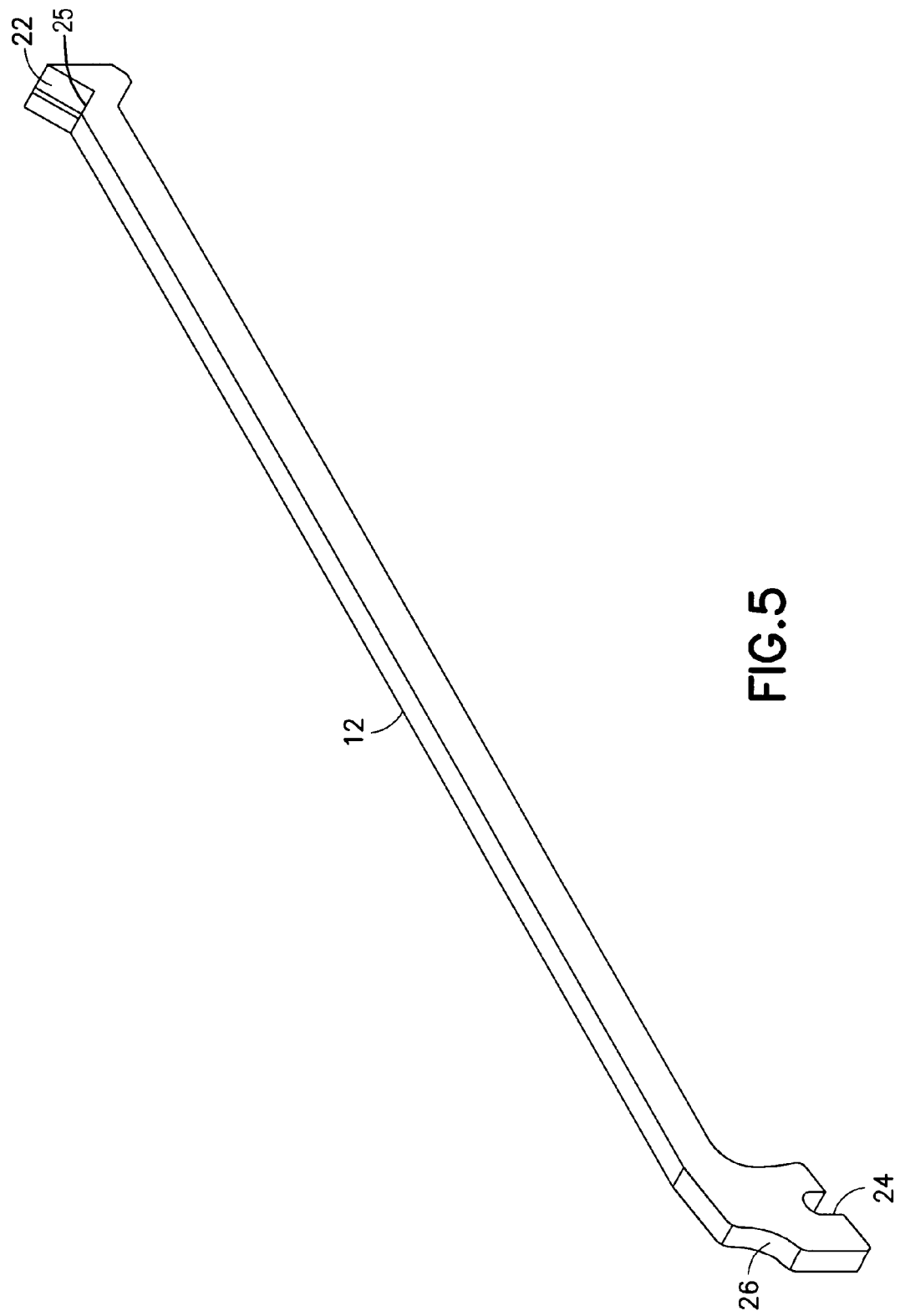
FIG. 5 is a diagram showing an isometric view of a deburring blade with cutting insert in accordance with one embodiment.

The structure of the cutter blade 12 in accordance with one embodiment is shown in FIG. 5. The distal end of cutter blade 12 has a pocket 25 in which a carbide cutter tip 22 is brazed. In this example, the angle of the cutter tip 22 is 90 degrees. The proximal end of the cutter blade 12 has a slot or notch 24 and a fillet 26 as previously described.

Figure 6:
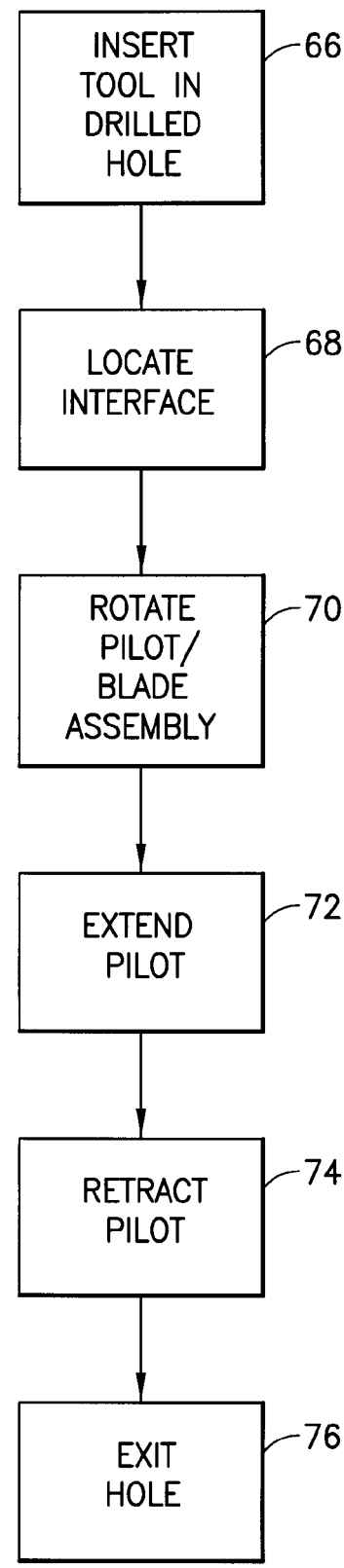
FIG. 6 is a flowchart showing a sequence of steps of a deburring operation employing the tool shown in FIG. 4.

The above-described assembly includes features that prevent axial displacement of the cutter blade during the deburring operation. The basic steps in that deburring operation are outlined in FIG. 6. First, the distal end of the pilot/blade assembly is inserted in the drilled hole (step 66). Then the metal composite interface is located using the technique previously described (step 68). It should be understood, however, that locating the While the pilot and blade are in their retracted positions, the pilot/blade assembly is rotated (step 70). More specifically, in response to a command to begin the deburring operation, the entire rotatable assembly (described above) is rotated by conventional means, e.g., an electric motor (not shown). While the pilot/blade assembly are rotating, the pilot is extended (step 72), which causes the blade to extend. During deburring, the interaction of a slot formed in the cutter blade with a blade attachment pin inside the deburring tool prevents the blade from moving axially. More particularly, if the metal burr at the metal/composite interface is being removed by the forward edge of the double-acting cutter tip, the blade will not move toward the tool body, whereas if the metal burr at the metal/composite interface is being removed by the rearward edge of the double-acting cutter tip, the blade will not move away from the tool body. When deburring at the interface has been completed, the pilot is retracted (step 74), which causes the blade to retract. The pilot/blade assembly then exits the hole (step 76).

While a deburring tool has been described with reference to a particular embodiment, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiment.

The method claims set forth hereinafter should not be construed to require that the steps recited therein be performed in alphabetical order or in the order in which they are recited. Nor should they be construed to exclude any steps being performed concurrently.

The invention claimed is:

1. A rotary deburring tool comprising:
    a hollow body having an axis of rotation and comprising a bore parallel to the axis and a pin that is not parallel to the axis;
    a pilot holder comprising an opening at a forward end thereof and a piston portion slidably nested in said bore of said hollow body, said pilot holder being axially movable relative to said hollow body, wherein said piston portion of said pilot holder comprises a cylindrical bore that is partially closed at one end;
    a pilot comprising a proximal end that is received in said opening in said pilot holder and a longitudinal slot;
    a cutter blade comprising a shaft having a portion disposed inside said slot of said pilot, a pocket disposed near a distal end of said cutter blade, and a slot disposed near a proximal end of said cutter blade, said slot comprising first and second mutually opposing side edges disposed on opposite sides of said pin, wherein said pin in said slot blocks relative movement of said cutter blade in both axial directions, but does not block pivoting of said cutter blade about said pin;
    a cutter tip attached to and seated in said pocket of said cutter blade;
    a round nose plunger slidably nested in said cylindrical bore; and
    a spring disposed between said round nose plunger and said partially closed end of said piston portion of said pilot holder, wherein said spring is in a state whereby it urges said round nose plunger in a forward axial direction, and wherein said proximal end of said cutter blade comprises a fillet that is in contact with a portion of said round nose plunger which is not centered relative to said axis of rotation.

2. The tool as recited in claim 1, further comprising means for driving said pilot holder to move relative to said hollow body in either of said axial directions.

3. The tool as recited in claim 2, further comprising means for limiting movement of said pilot holder relative to said hollow body in both of said axial directions.

4. A rotary deburring tool comprising a non-rotating assembly and a rotatable assembly rotatably supported by bearings mounted to the non-rotating assembly, said rotatable assembly being rotatable around an axis of rotation, wherein:
    said non-rotating assembly comprises an air cylinder body and a piston assembly slidably nested inside said air cylinder body; and
    said rotatable assembly comprises a hollow body having a cylindrical bore, a pin attached to said hollow body, pilot holder having a hollow piston portion which is slidably nested in said cylindrical bore of said hollow body, a pilot having a proximal end received in an opening of said pilot holder and comprising a longitudinal slot, and a cutter blade comprising a distal end portion comprising a double-acting cutter tip, a proximal end portion comprising a slot, and a shaft portion connecting said distal and proximal end portions, a portion of said shaft portion being disposed in said longitudinal slot of said pilot, and said pin on said hollow body being disposed in said slot of said cutter blade, said slot comprising mutually parallel side edges oriented perpendicular or nearly perpendicular to said axis of rotation, wherein said pin in said slot blocks relative movement of said cutter blade in both axial directions, but does not block pivoting of said cutter blade about said pin.

5. The tool as recited in claim 4, wherein said shaft portion of said cutter blade is in the shape of a bar that extends along a longitudinal axis, and said distal end portion of said cutter blade further comprises a heel portion.

6. The tool as recited in claim 4, wherein said proximal end portion of said cutter blade further comprises a curved concave recess having a surface which is disposed asymmetrically relative to said longitudinal axis.

7. The tool as recited in claim 6, wherein said piston portion of said pilot holder comprises a cylindrical bore that is partially closed at one end, further comprising a round nose plunger slidably nested in said cylindrical bore and a spring disposed between said round nose plunger and said partially closed end of said piston portion of said pilot holder, wherein said spring is in a state whereby it urges said round nose plunger in a forward axial direction, and wherein said curved concave recess of said cutter blade is in contact with a portion of said round nose plunger.

8. The tool as recited in claim 4, wherein said distal end portion of said cutter blade further comprises a pocket, wherein said cutter tip is disposed in and attached to said pocket.

* * * * *